UNITED STATES PATENT OFFICE.

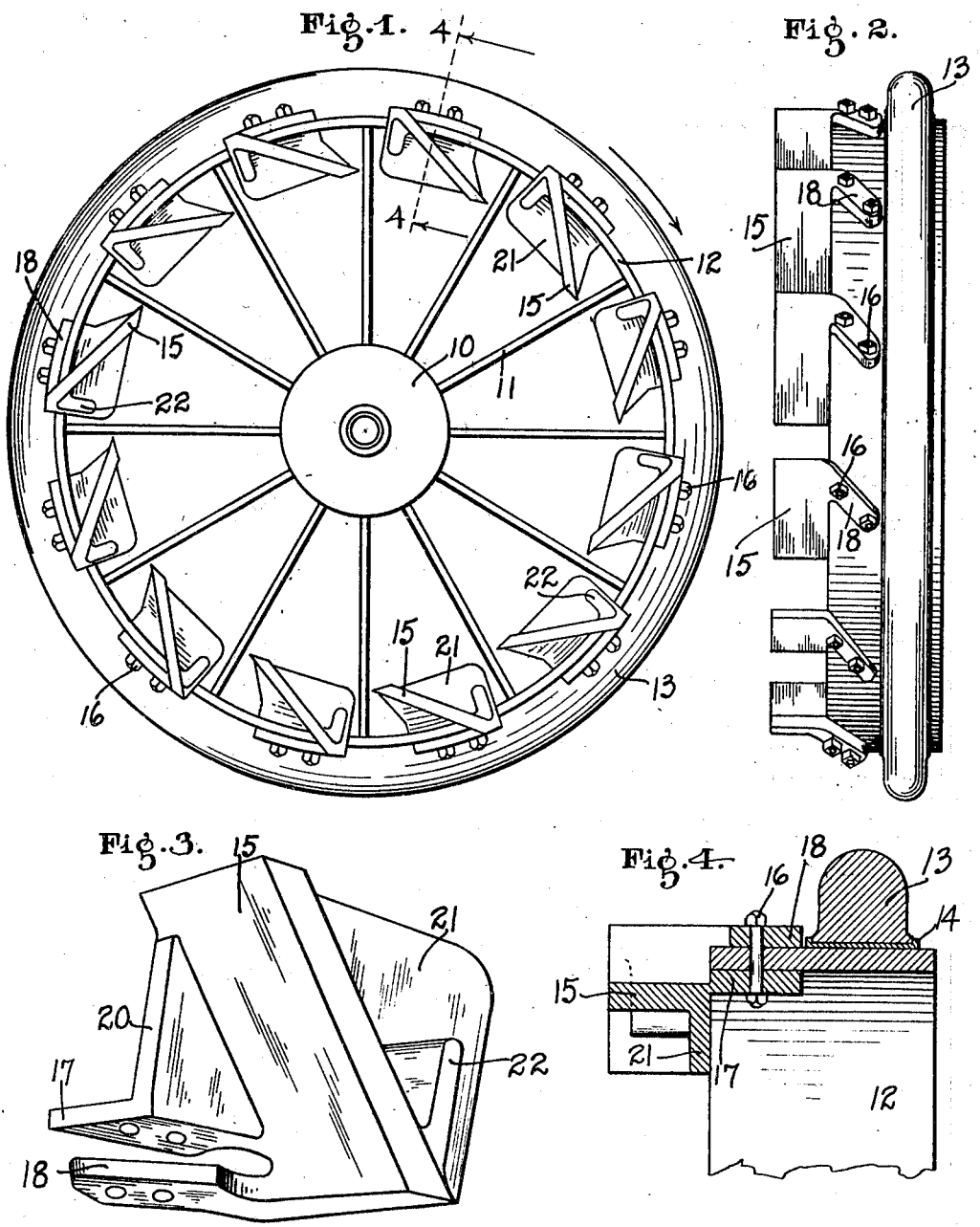

JOHN W. LAMBERT, OF ANDERSON, INDIANA.

TRACTION-WHEEL.

1,112,920. Specification of Letters Patent. Patented Oct. 6, 1914.

Application filed August 7, 1912. Serial No. 713,842.

*To all whom it may concern:*

Be it known that I, JOHN W. LAMBERT, a citizen of the United States, and a resident of Anderson, county of Madison, and State of Indiana, have invented a certain useful Traction-Wheel; and I do hereby declare that the following is a full, clear, and exact description thereof, reference being had to the accompanying drawings.

The object of this invention is to provide an improved construction of traction wheel and the like for causing it to operate satisfactorily on soft ground. To that end the wheel is made relatively light in weight so as to avoid the difficulties of a heavy wheel which sinks or buries itself in the ground by reason of its enormous weight. Means are added to the wheel which are relatively light tor supporting the wheels upon the ground and preventing its sinking, said added means being readily removable from the rim of the wheel so that they need not be used when not needed and at that time their weight will not be added to the weight of the wheel. Along with the foregoing is the combination with tread plates extending laterally from the rim of the wheel and a rubber or other tire surrounding the rim of the wheel and projecting radially beyond said tread plates. Consequently on ordinary dried or hard ground, the large tire will support the wheel so that the tread plates are held out of contact with the ground, but in soft ground, when such a tire of relatively less width than the rim of the wheel cuts into the ground, the tread plates will come into use by engaging the surface of the ground and preventing the wheel sinking any lower.

The nature of the invention will be understood from the accompanying drawings and the following description and claims.

In the drawings, Figure 1 is a side elevation of the wheel. Fig. 2 is a rear elevation thereof. Fig. 3 is a perspective view of one of the tread plates. Fig. 4 is a transverse section through a portion of the wheel on the line 4—4 of Fig. 1.

The body of the wheel may be made in any desired manner, that shown in the drawings herein having a hub 10, spokes 11 and a wide flat rim 12. Upon and surrounding this flat rim 12 there is a rubber tire 13 secured in place by an annular plate 14 with its lateral edges turned outwardly at a right angle from the rim 12, although the invention is not limited to the manner in which said rubber tire is secured to the wheel, nor, in fact, to the particular sort of tire 13, whether of rubber or other material or other construction which projects radially beyond the rim.

The tire is placed somewhat to one side of the middle of the rim and to the other side or lateral edge, the tread plates 15 are secured by bolts 16. These tread plates have two parallel lateral projecting arm plates 17 and 18 with a space between them of substantially the same width as the rim of the wheel so that said arm plates can be laterally spaced on the rim of the wheel and they have holes through them corresponding with similar holes throug the rim 12 of the wheel for the passage of the bolts 16. There are two sets of holes and two bolts for securing each tread plate 15 to the rim of the wheel and they are arranged so that they can be readily removed by taking out the two bolts and also the arm plates 17 and 18 have flat relatively wide inner surfaces closely engaging the inner and outer surfaces of the rim of the wheel so as to make the connection of the tread plates very secure and strong. The arm plate 17 is secured to the tread plate 15 by a brace 20 substantially triangular in form, see Fig. 3, and said brace 20 is in line with another plate or brace 21 on the other side of the tread plate so as to make said plates 20 and 21 extending radially and in the same plane substantially, and there is a further brace 22 extending outwardly from the plate 21 and inwardly toward the center of the wheel from the tread plate 15. This makes a very strong tread plate construction suitably braced and readily removable from the rim of the wheel and the construction is such that the tread plates will extend at an inclination from the rim of the wheel, as shown in Fig. 1, so that as the wheel travels in the direction shown by the arrow in Fig. 1, assuming the ground to be soft and the wheel to sink somewhat, the flat lower side of the tread plate will come wholly or usually only partially into engagement with the ground and then as the wheel travels farther, the tread plate will push backwardly against the ground just like the bottom of a horse's hoof when pulling so that the broad underside of the tread plate will impact against the soft ground and prevent the wheel from raising or turning without traveling, as power is applied to the wheel.

I claim as my invention:

Tread plates adapted to be secured to the rim of a traction wheel and consisting of a tread plate portion, two parallel arm plates extending laterally from one end thereof, a brace plate between the inner one of said arm plates and said tread plate, a brace plate on the opposite side of said tread plate and extending for the length of the tread plate and at a right angle thereto, and a cross brace plate secured to said last-mentioned brace plate and the outer end of the tread plate.

In witness whereof, I have hereunto affixed my signature in the presence of the witnesses herein named.

JOHN W. LAMBERT.

Witnesses:
RAYMOND H. ROSS,
H. L. WOODRUFF.

Copies of this patent may be obtained for five cents each, by addressing the "Commissioner of Patents, Washington, D. C."